United States Patent [19]

Prevorsek et al.

[11] Patent Number: 5,556,704

[45] Date of Patent: Sep. 17, 1996

[54] CARBON FIBER-REINFORCED CARBON COMPOSITE MATERIAL

[75] Inventors: Dusan C. Prevorsek, Morristown; Hsin L. Li, Parsippany, both of N.J.

[73] Assignee: AlliedSignal Inc., Morris Township, N.J.

[21] Appl. No.: 305,530

[22] Filed: Sep. 13, 1994

Related U.S. Application Data

[62] Division of Ser. No. 13,895, Feb. 5, 1993, Pat. No. 5,582,392.

[51] Int. Cl.⁶ .................................................. C04B 35/52
[52] U.S. Cl. ................................... 428/408; 428/244
[58] Field of Search ........................... 428/244, 408; 264/29.5, 29.7; 423/447.2, 447.7

[56] References Cited

U.S. PATENT DOCUMENTS

| | | | |
|---|---|---|---|
| 3,734,797 | 5/1973 | Byers | 156/253 |
| 3,917,884 | 11/1975 | Jahn | 427/228 |
| 3,944,686 | 3/1976 | Froberg | 427/228 |
| 4,100,322 | 7/1978 | Seibold et al. | 428/257 |
| 4,190,637 | 2/1980 | Kennedy | 423/448 |
| 4,198,382 | 4/1980 | Matsui | 423/445 |
| 4,201,661 | 5/1980 | Stover | 156/155 |
| 4,208,267 | 6/1980 | Diefendorf et al. | 208/22 |
| 4,339,021 | 7/1982 | Kosuda et al. | 191/50 |
| 4,409,048 | 11/1983 | Hatch et al. | 156/155 |
| 4,522,883 | 6/1985 | Wallace et al. | 428/365 |
| 4,554,024 | 11/1985 | Zimmer et al. | 106/284 |
| 4,704,333 | 11/1987 | Elkins et al. | 423/447.1 |
| 4,847,021 | 7/1989 | Montgomery et al. | 264/29.3 |
| 4,929,404 | 5/1990 | Takahashi et al. | 264/29.5 |
| 4,929,505 | 5/1990 | Washburn et al. | 728/408 |
| 4,975,261 | 12/1990 | Takabatake | 923/445 |
| 4,975,262 | 12/1990 | Suto et al. | 423/447.1 |
| 4,986,943 | 1/1991 | Sheaffer et al. | 264/29.1 |
| 4,998,709 | 3/1991 | Griffin et al. | 264/29.5 |
| 5,051,300 | 9/1991 | Rousseau | 428/245 |
| 5,057,254 | 10/1991 | Sohda et al. | 264/29.2 |
| 5,057,341 | 10/1991 | Ogiso et al. | 427/387 |
| 5,061,414 | 10/1991 | Engle | 264/29.5 |
| 5,071,700 | 12/1991 | Sugino et al. | 428/283 |
| 5,077,130 | 12/1991 | Okuyama et al. | 428/408 |
| 5,114,635 | 5/1992 | Sohda et al. | 264/29.2 |
| 5,147,588 | 9/1992 | Okura et al. | 264/29.7 |
| 5,147,855 | 9/1992 | Okura et al. | 264/29.7 |
| 5,181,979 | 1/1993 | Uemura et al. | 156/89 |
| 5,186,873 | 2/1993 | Uemura et al. | 264/29.5 |
| 5,188,894 | 2/1993 | Yamada et al. | 428/370 |
| 5,205,888 | 4/1993 | Mochida et al. | 156/89 |
| 5,209,975 | 5/1993 | Miyazaki et al. | 428/364 |
| 5,236,728 | 8/1993 | Sumner et al. | 423/447.4 |

FOREIGN PATENT DOCUMENTS

| | | |
|---|---|---|
| 0251301 | 6/1987 | European Pat. Off. . |
| 0335736 | 4/1989 | European Pat. Off. . |
| 61-77667 | 9/1984 | Japan . |
| 61-777667 | 4/1986 | Japan . |
| 2-51414 | 2/1990 | Japan . |
| 2-153737 | 6/1990 | Japan . |
| 3-60415 | 3/1991 | Japan . |
| WO80/02552 | 11/1980 | WIPO . |
| 92/01648 | 2/1992 | WIPO . |

OTHER PUBLICATIONS

Composites News, "Carbon/carbon elevon set for load/thermal testing" Advanced Composites, Jul./Aug. 1991.

Advanced Materials, "Carbon–Carbon Specialist Consider Alternative Raw Materials", Apr. 8, 1991, vol. 13, No. 7.

Graphitization of Soft Carbons, Jacques Marie and Jacques Mering, Chemistry and Physics of Carbons, vol. 6, 1970, 125–191.

(List continued on next page.)

*Primary Examiner*—Mathieu D. Vargot
*Attorney, Agent, or Firm*—Roger Criss; Melanie L. Brown

[57] ABSTRACT

This invention relates to a carbon-carbon composite material formed by applying a vertical compressive force and a variable lateral force simultaneously to a mixture of carbon fiber and a carbon precursor material during carbonization of the mixture.

19 Claims, 2 Drawing Sheets

OTHER PUBLICATIONS

"The Effect of Chemical–Vapor Deposition Conditions of the Properties of Carbon–Carbon Composites", vol 11, pp. 177–187, 1973.

"The Chemical Vapor Deposition of Carbon on Carbon Fibers", H. Pieson and M. Lieberman, vol. 13, pp. 159–166, 1974.

"Continous Carbon Fiber Reinforced Carbon Matrix Composites" American society for metals, vol. 1, Eng Materials Handbook, 1987, 911–914.

"The Future of Carbon Carbon Composites" vol. 25, No. 2 pp. 163–190, 1987.

"Process of Infiltration of Porous Carbon Bodies by CVD Carbon and Properties of Resulting Composites", Journal de chimie physique, 84, 1987, 1421–1430.

"Effects of pressure carbonization in the C—C composites process", T. Hosomura and H. Okamoto, Materials Science and Engineering, pp. 223–229.

"Mechanism of Anisotrophy Occurrence in a Pitch Precursor of Carbon Fibers: Part I—Pitchers A and B", Carbon vol. 29, No. 7 pp. 831–847, 1991.

"High Performance Polymers" pp. 136–172, 1991, Hanser Publishers.

"Infiltration and Coating of the Porous Carbonaceous Bodies By Chemical Vapour Deposition " vol. 29, Nos 4 & 5, pp. 605–611, 1991.

Carbon and International Journal, vol 31, No. 5, "Carbon–Fiber–Reinforced Carbon Composites Fabricated with Mesophase Pitch" pp. 731–750, 1993.

"Polybenzimidazole (PBI) as a Matrix Resin Precursor for Carbon/Carbon Composites", Robert B. Sandor, Apr. 1991, pp. 23–28.

Handbook of Composites, vol. 4, Multidirectional Carbon–Carbon Composites pp. 109–175, Elsevier Science Publishers, 1983.

CARBON FIBER-REINFORCED CARBON COMPOSITE MATERIAL

This application is a division of application Ser. No. 08/013,895, filed Feb. 5, 1993, now U.S. Pat. No. 5,382,392.

BACKGROUND OF THE INVENTION

1. Field of the Invention

This invention relates to a method for the manufacture of carbon-carbon composite materials. More particularly, this invention relates to a process for manufacture of carbon-carbon materials having improved properties.

2. Prior Art

The established techniques for manufacture of carbon-carbon composite material for use in such products as friction discs for aircraft brakes involve long time scales whether the carbon-carbon composite material is formed by a technique involving the charring of an organic material such as a phenolic resin or pitch or by a chemical vapor infiltration technique. See for example, U.S. Pat. Nos. 3,944,686; and 4,554,024; E.P. Publication No. 0 251 301; and PCT/GB91/01187.

SUMMARY OF THE INVENTION

In accordance with one of its aspects, the present invention provides a method for the manufacture of a carbon-carbon composite material comprising heating a mixture of a material which yields carbon when heated to a temperature of at least 600° C. at normal atmospheric pressure (preferably at least 60% carbon by weight of said material) and carbon fibers to a temperature of at least 600° C. (preferably at normal atmospheric pressure) whilst the mixture is acted upon by press means to apply a substantially uniaxial compressive load and is acted upon by a variable lateral restraining means to control the lateral deformation of said mixture resulting from application of said compressive load, and maintaining the applied temperature, the uniaxial compressive load and said variable lateral restraining means for a time sufficient to consolidate the mixture whilst in its softened condition, to substantially wholly carbonize the material, and to densify the material at least during the carbonizing process to a density which is preferably equal to or greater than about 1.5 g/cm$^3$, more preferably equal to or greater than about 1.7 g/cm$^3$ and most preferably equal to or greater than about 2.0 g/cm$^3$. Another aspect of this invention relates to a carbon-carbon composite material formed by the process of this invention.

DESCRIPTION OF THE PREFERRED EMBODIMENTS

Figure 1:
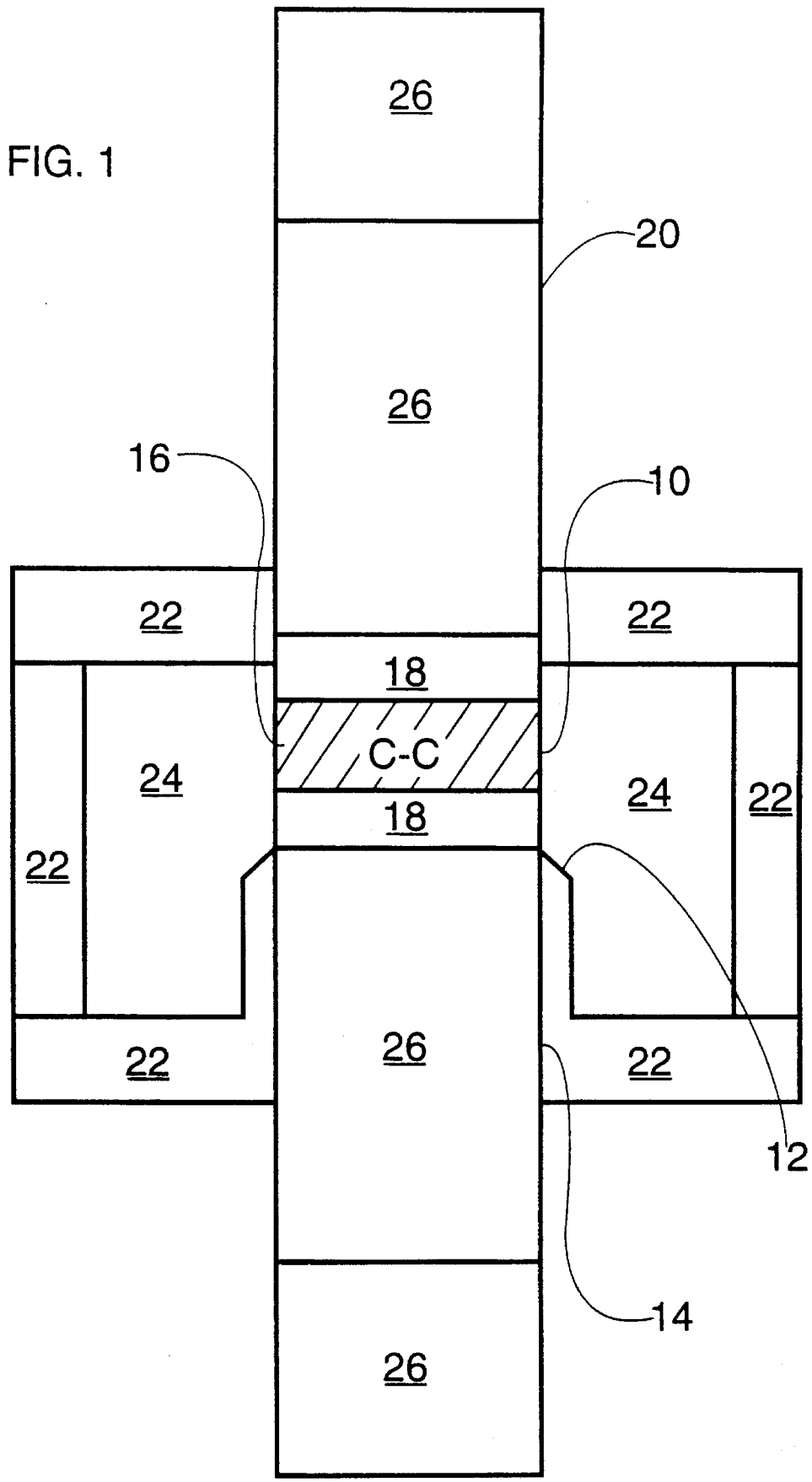
FIGS. 1 and 2 are shematics of a device for use in the preferred embodiments of the invention showing simultaneous application of the uniaxial compressive force and variable lateral restraining force.

The process of this invention includes two essential features. The first essential feature is an application of a unaxial compressive force to the mixture during the heating step which functions to densify the mixture. The force can be applied by any conventional means. For example, a press means can be employed which may be in the form of a membrane, e g a flexible membrane, acted upon by fluid pressure but which applies a compressive force only to a surface of said mixture and prevents the fluid entering any interstices within the mixture. More preferably, however, the force is applied by a press means comprises a rigid member, such as a conventional press platen.

Preferably the method comprises application of the unaxial compressive force for substantially the whole of the time for which the mixture is subject to said temperature of at least 600° C. It is envisaged that whilst maintained at an elevated temperature the press means will be operated upon to enable it to move thereby to accommodate any shrinkage of the overall external volume of the mixture and/or to consolidate the mixture in its softened condition.

As a second essential feature the process includes application of a variable restraining lateral force simultaneous with application of the uniaxial copressive force to restrain or contol the lateral deformation of the mixture due to application of unaxial compressive force. The lateral restraining force is varied to maintain the internal strain within the compressed material below a value at which internal would fracture of the carbonized mixture yet at a value sufficient to allow the desired densification of the product. Where only the compressive force is controlled or where the lateral restraining force is isostatic and not varied inferior results are provide.T The strength of the restraining force and the extent to which it is varied may vary widely, and is usually sufficient to maintain the amount of lateral deformation to less than about 10%, preferably less than about 5%, more preferably equal to or less than about 2% and most preferably equal to or less than about 1%. A result is that cracking of the carbonized mixture is minimized and the density of the carbonized material is enhanced. The density is preferably greater than about 1.5 gm/cm$^3$, more preferably greater than about 2.0 gm/cm$^3$ and most preferably greater than about 2.1 gm/cm$^3$.

The variable restraining force can be applied and varied using any conventional means. For example, the force can bo applied using a hydraulic piston arrangement. The lateral restraining force may also by applied by a tubular mold having a variable diameter. In this apparatus the vertical or uniaxial compressive forse is controlled by the press and the lateral restraining force is controlled or varied by moving the mixture up and down the tubular mold and thus varying the lateral force by varying the mold diameter. The variations in mold size wil depend on a number of variables including the thermal expansion coefficient, flow of the mixture, lateral expansion due to vertical compression, type of matrix polymer and fiber, densification due to carbonization and pyrolysis and the like.

Means may be provided to maintain substantially atmospheric pressure and vent means may be provided to ensure that gases evolved during carbonization do not cause an undesirable increase of gas pressure. Alternatively the by products of carbonizing may be removed for example by a vacuum system.

Suitable polymeric materials for acting as precursors to produce a carbon matrix around the carbon fibers are preferably of the high char yield type, i.e. of a type which are capable of yielding by weight of carbon greater than 60% of their original weight when heated to a temperature of at least 600° C. These include thermoplastic polymers and pitches (including pitch solutions) and thermosetting polymers and mixes thereof. Examples of particularly suitable materials are mesophase pitches or green cokes which are pitches processed to a stage just before carbonization. Whilst pitches are normally products of coal and petroleum industries it is to be understood that suitable pitches may be synthesised from organic materials and this invention includes the use of synthesised organic materials.

The polymeric material is preferably selected to be of a kind which yields by weight of carbon greater than 60% of its initial weight when heated to at least 600° C., which may be referred to as a high char yield material, more preferably yields at least 70% and most preferably 80% or more by weight of carbon when so heated.

The carbon fibers can be of any of the kinds well known to those skilled in the art of forming carbon composite materials. Examples of suitable precursor materials for the carbon fibers include polyacrylonitrile, pitch and rayon.

The carbon fibers may be discrete staple length fibers or may be of a relatively long length substantially continuous filamentary form. Particularly when of a filamentary form they may be formed into a fabric such as a woven fabric. Alternatively fibers of staple and/or filamentary form may be formed into a non-woven fabric by other techniques e g by needle punching. The carbon fibers typically are to have a length greater than 10 mm and preferably greater than 25 mm.

The initial combination of polymeric material and carbon fibers for subjecting to compression under elevated temperature conditions may be formed by for example conventional techniques familiar to those skilled in the manufacture of composite materials. These techniques include for example the dipping of carbon fibers into molten pitch, impregnating a fabric of fibers with a solution of the pitch, adding pitch in the form of a powder to a layer of fibers, film stacking techniques in which layers of carbon fiber material are alternated with layers of plastics and combinations thereof. These techniques can be applied also to the use of polymeric materials other than pitch. The initial combination of polymeric material and carbon fibers may also be in the form of a mounding compound.

The actual temperature chosen for carbonizing preferably is selected to result in the materials exhibiting plastic behavior and thereby being susceptible to mechanical deformation under the action of the press means. Although the temperature used to carbonize the polymeric material should be at least 600° C. it is envisaged that normally it will not exceed 3000° C. above which carbon materials start to vaporize.

The mixture of polymeric material and carbon fibers preferably is one in which the carbon fibers are distributed uniformly within the polymeric material. More preferably the mixture of matrix and embedded fibers is substantially devoid of interstices. The fibers may be uniformly distributed and whether or not uniformly distributed may be provided in a random orientation or be preferentially oriented if the resulting material is required to have particular properties in one or more preferential directions.

As a part of or subsequent to the process of forming a mixture of polymeric material and carbon fibers the mixture may be shaped in a mound to form a preform in a pre-carbonization step. Initial shaping of the preform may take place in a mound from which, after cooling of a mixture, the mixture is transferred to a furnace for heating to a higher temperature than that, preferably greater than about 300° C. and more preferably greater than about 400° C. used during a preliminary mounding stage. Alternatively the preliminary mounding stage and heating to a temperature greater than 300° C., preferably equal to or greater than 350° C., more preferably equal to or greater than 400° C. and most preferably equal to or greater than 450° up to in the order of 300° C. may be performed in the same enclosure as that subsequently used to heat to a higher temperature for carbonization.

A product formed by the method of the present invention may be re-impregnated with polymeric material and reheated to a temperature of greater than 600° C. and, optionally again under simultaneous variable lateral restraint and uniaxial compressive force preferably mechanical load, to convert that additional polymeric material into carbon and thereby further increase the density of the product. Alternatively the density of the product may be increased by for example a chemical vapor deposition technique.

By way of illustration examples of the method of the invention will now be described which shoud not be sonstued as limitations thereon.

Preform processed at 300° C.

Example 1

A 3-dimensional non-woven carbon fiber preform 3" diameter and 1.2" thick with a bulk density of 0.50 g/cc was placed into the cavity of a resin transfer mold with the same dimensions. The resin transfer mold was then heated to 300° C. with a flow of nitrogen passing through the mold and preform to eliminate the presence of oxygen. Ashland A80 petroleum pitch was crushed and placed into the reservoir. The reservoir was then heated to 300° C. at a rate of 5° C./min in a nitrogen atmosphere. After the pitch in the reservoir reached 300° C., it was injected into the mold and heated for 2 hours at 50 psi pressure. The mold was then opened and the impregnated preform was removed. The preform had a matrix content of 10% by weight and no change in dimensions. The low matrix content in the preform was due to the high content of hydrocarbons with boiling points below 300° C. in the pitch.

Preform Processed at 440° C.

Example 2

In order to insure good impregnation of the pitch, hydrocarbons with boiling points below the processing temperature are removed during a heat treatment step. Ashland A80 petroleum pitch was placed into a rapidly stirred kettle and heated to 440° C. at a rate of 5° C./min for 1 hour. Nitrogen was passed through the reactor such that it assists in carrying volatile components out of the reactor into a condenser. After one hour of heating, 8% by weight of condensed volatiles were removed from the pitch. The material was stirred while being cooled at a rate of 10° C./min. The material was then crushed into a powder and tumbled to assure a homogenous material.

A 3-dimensional non-woven carbon fiber preform, 3" diameter and 1.2" thick, with a bulk density of 0.50 g/cc was placed into the cavity of a RTM mold with the same dimensions. The RTM mold was then heated to 440° C. with a flow of nitrogen passing through the mold and preform to eliminate the presence of oxygen. The heat treated pitch was crushed and placed into the reservoir. The reservoir was then heated to 440° C. at a rate of 5° C./min in a nitrogen atmosphere. After the material in the reservoir reached 440° C., it was injected into the mold and heated for 2 additional hours at 50 psi pressure. The mold was opened and the impregnated preform was then removed from the mold. The preform had a matrix content of 64% by weight with no dimensional changes yielding a final density of 1.1 g/cc.

Example 3

Figure 2:
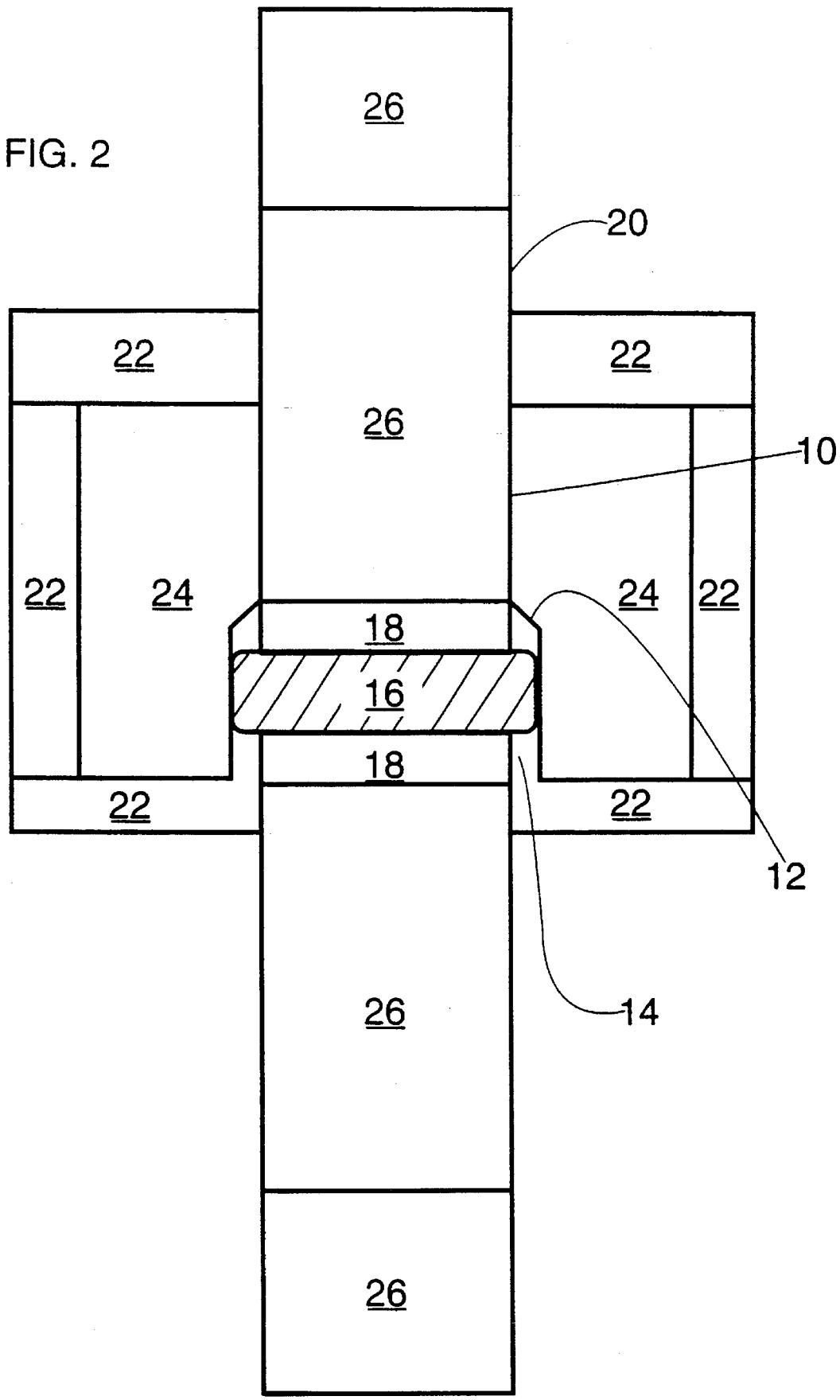

Experimental setup of this invention with mold of variable diameters is schematically shown in FIGS. 1 and 2. The mold is machined from high strength Poco (TM) graphite rod. The mold had a outside diameter of 8.00". The inner surface was longitudinally macahined into three zones of variable diameters: upper zone with a diameter of 3.010"×3" Length; transition zone with diamters diverging from 3.010" to 3.040"×0.2" length; lower zone with a diameter of 3.040"×3.5" length.

The preform of 3." diameter×1.25" length, as described in details in Example 2, was sandwiched between two thin graphite blocks and each block was 2.998" diameter×0.5" thick. The blocks could be replaced easily after each carbonization/graphitization cycle and are effectively used to protect the plungers from any potential wear. The preform and the two blocks were placed inside the mold as shown in FIG. 1. The thermal insulation used is commercially available CalCarb (TM) which consisted of zircon fibers and proprietary binders. The whole assembly was placed inside an vacuum chamber and after a vacuum level of 29" Hg was reached, the vacuum pump was shut off and Argon gas, under a pressure of 5 psi, flowed into the vacuum chamber. The graphite mold, two plungers, preforms and two blocks were heated by a 22 kw induction heater manufactured by Inductotherm.

The heating rate was 15° C./min till the temp. reached 400° C., and a constant pressure of 7 ksi was exerted on the plunger while heating was continued till 1,000° C. At the temp. of 1,000° C., the pressure on the lower plunger was reduced while the upper plunger maintained the full pressure, or 7 ksi, and pushed the carbonized preform from the upper zone to the lower zone of larger diameter of 3.040 inch to compensate for the thermal coef. of expansion and control the radial, or horizontal, pressure at the higher temp.>1,000° C. as shown in FIG. 2. Heating was continued till the maximum temp. of 1,800° C. was reached. Cooling cycle was followed immediately and pressure was released to ambient when the temp. reached 450° C. The total cycle time was approx. 5 hours which represents an order of magnitude of improvement, in cycle time, over the patent application PCT/GB91/01187 which claims the cycle time in days.

The carbonized/graphitzed c–c" sample (B70T5) had a measured dimensions of 3.050" diameter×0.28" thick with a density of 1.72 gm/cc corresponding to a porosity of approx. 10%. The sample was cut into two circular pieces and each with a diameter of 0.75 inch. One piece was tested against fricitional wear-loss while the other for compressive strength. The wear-loss tests were conducted as follows. The sample was rubing under 220 psi pressure against a commercially available carbon disc of 11 inch in diameter with a rotationsl surface speed of 35 mph. The sample was engaged the carbon disc continuously for 10 min and disengaged for 10 min. and the sequences were repeated ten times. The wear-loss was 151 mg. as shown in the following Table 4. This compared to the wear-loss of 215 mg. of commercially available frictional pads, control sample, tested under otherwise idnetical conditions. The compressive strengths of the sample (B70T5) and commercially available samples were 36 ksi and 30 ksi, respectively, as shown in the Table 1.

TABLE 1

| Sample # | Process temp/press/time C./ksi/hrs. | Density gm/cc | Wear-loss mg | Compr. strength ksi |
| --- | --- | --- | --- | --- |
| control sample | —/—/700 | 1.77 | 215 | 30.2 |

TABLE 1-continued

| Sample # | Process temp/press/time C./ksi/hrs. | Density gm/cc | Wear-loss mg | Compr. strength ksi |
| --- | --- | --- | --- | --- |
| B70T5 | 1800/7 ksi/5 | 1.72 | 151 | 36 |
| B70T4 | 1800/6 ksi/5 | 1.63 | 850 | 33 |
| B70T4-I | 1800/6 ksi/5 | 1.73 | 107 | 35 |
| A61T4 | 1800/6 ksi/5 | | sample cracked | |
| A81T1 | 1800/7 ksi/5 | 1.29 | severe delamination | |

Example 4

Example 3 was repeated except that the preform stayed within the upper zone during the entire carbonization/graphitization process. The sample, A61T4, had spirally shaped cracks observed along the edges toward the center. The diameter of the sample was 3.045" which was about 0.040 inch larger than the diameter of the mold and cracks were expected. No tests could be conducted with this sample.

Example 5

Example 3 was repeated except that the pressure was reduced from 7 ksi to 6 ksi. The sample, B70T4, had a density of 1.63, wear-loss of 850 mg and compressive strength of 33 ksi.

Example 6

Example 5 was repeated except the sample, #B70T4, was infiltrated with furan resin/furfural alcohol/phthalic anhydride mixture to fill up the porous spaces under a pressure of 20 psi, then, carbonized under a temp. of 500° C. and pressure of 2 ksi for about an hour. This sample, B70T4-1, had a wear-loss of 107 mg and compresive strength of 35 ksi which showed considerable improvements over the sample, B70T4, without infiltration.

Example 7

Experiment 3 was repeated except that the preform used was prepared at 300° C. as described in Example 1. The density of the sample, A81T1, was 1.29 gm/cc, Table 1, with severe delamination. No tests could be conducted.

What is claimed is:

1. A carbon-carbon composite material manufactured by a method comprising heating a mixture of a polymeric material which yields carbon when heated to a temperature of at least 600° C. and carbon fibers to a temperature of at least 600° C. whilst the mixture is acted upon by press means to apply a substantially uniaxial compressive load and is acted upon by a lateral restraining means to control the lateral deformation of said mixture during application of said compressive load, said lateral restraining means comprising a tubular mold having a variable diameter and maintaining the applied temperature, the uniaxial compressive load and said lateral restraining means to consolidate the mixture whilst in its softened condition, to substantially wholly carbonize the material, and to densify the material during the carbonizing process.

2. The carbon-carbon composite material of claim 1 wherein the mixture of polymeric material and carbon fibers is caused to adopt a desired shape during a pre-carbonisation stage in which it is heated to a pre-carbonization temperature greater than 300° C.

3. The carbon-carbon composite material of claim 2 wherein said pre-carbonisation temperature is equal to or greater than about 400° C.

4. The carbon-carbon composite material of claim 2 wherein said polymeric material is a thermoplastic material.

5. The carbon-carbon composite material of claim 2 wherein said polymeric material is a thermosetting material.

6. The carbon-carbon composite material of claim 2 wherein said polymeric material is a pitch.

7. The carbon-carbon composite material of claim 6 wherein said polymeric material is a pitch solution.

8. The carbon-carbon composite material of claim 7 wherein said pitch is a mesophase pitch.

9. The carbon-carbon composite material of claim 4 wherein said polymeric material is a resin.

10. The carbon-carbon composite material of claim 9 wherein said polymeric material is of a kind which yields by weight of carbon greater than 70% of its initial weight when carbonized.

11. The carbon-carbon composite material of claim 10 wherein said polymeric material yields by weight of carbon at least 80% of its initial weight when carbonized.

12. The carbon-carbon composite material of claim 15 wherein said polymeric material is mixed with the carbon fibers prior to the consolidation and carbonization process.

13. The carbon-carbon composite material of claim 1 wherein said mixture of polymeric material and carbon fibers is of a form in which the carbon fibers are substantially uniformly distributed within the polymeric material.

14. The carbon-carbon composite material of claim 1 wherein said polymeric material and carbon fibers are combined by dipping of the carbon fibers in molten pitch.

15. The carbon-carbon composite material of claim 1 wherein said carbon fibers are in the form of a fabric which is impregnated with a pitch solution.

16. The carbon-carbon composite material of claim 1 wherein pitch is added to a layer of carbon fibers in a powdered form.

17. The carbon-carbon composite material of claim 1 wherein a film stacking technique is employed to combine layers of carbon fiber material and layers of plastics.

18. The carbon-carbon composite material of claim 1 wherein said carbon fibers have a length of at least 10 mm.

19. The carbon-carbon composite material of claim 1 wherein said carbon fibers have a length of at least 25 mm.

* * * * *